(12) United States Patent
Shima et al.

(10) Patent No.: US 7,657,928 B2
(45) Date of Patent: Feb. 2, 2010

(54) COMMUNICATION APPARATUS AND ASSOCIATED METHOD OF CONTROLLING DISTRIBUTION OF CONTENT TO NETWORK DEVICES

(75) Inventors: Hisato Shima, Tokyo (JP); Takehiko Nakano, Kanagawa (JP)

(73) Assignee: Sony Corporation, Tokyo (JP)

( * ) Notice: Subject to any disclaimer, the term of this patent is extended or adjusted under 35 U.S.C. 154(b) by 622 days.

(21) Appl. No.: 10/527,981

(22) PCT Filed: Aug. 10, 2004

(86) PCT No.: PCT/JP2004/011475

§ 371 (c)(1),
(2), (4) Date: Mar. 21, 2005

(87) PCT Pub. No.: WO2005/015419

PCT Pub. Date: Feb. 17, 2005

(65) Prior Publication Data

US 2006/0063511 A1 Mar. 23, 2006

(30) Foreign Application Priority Data

Aug. 12, 2003 (JP) ............................. 2003-291971

(51) Int. Cl.
*G06F 15/16* (2006.01)
*G06F 7/04* (2006.01)
(52) U.S. Cl. ............................... 726/3; 726/27; 726/33
(58) Field of Classification Search ..................... 726/2, 726/3, 4, 11, 13, 27, 33; 713/151, 152, 162; 380/270, 201; 455/410; 326/8
See application file for complete search history.

(56) References Cited

U.S. PATENT DOCUMENTS

| 5,757,924 | A  | * | 5/1998 | Friedman et al. ............ 713/151 |
| 7,100,199 | B2 | * | 8/2006 | Ginter et al. ................... 726/4 |
| 2002/0077986 | A1 | * | 6/2002 | Kobata et al. ................. 705/52 |
| 2003/0110229 | A1 | * | 6/2003 | Kulig et al. ................. 709/207 |
| 2004/0117650 | A1 | * | 6/2004 | Karaoguz et al. ........... 713/200 |
| 2004/0117659 | A1 | * | 6/2004 | Karaoguz et al. ........... 713/201 |

(Continued)

FOREIGN PATENT DOCUMENTS

EP 1 523 133 4/2005

(Continued)

OTHER PUBLICATIONS

Taesombut, Nut et al., "A Secure Registration Protocol for Media Appliances in Wireless Home Networks", Multimedia and Expo, IEEE, vol. 3, pp. 109-112, 2003.

*Primary Examiner*—Eleni A Shiferaw
(74) *Attorney, Agent, or Firm*—Oblon, Spivak, McClelland, Maier & Neustadt, L.L.P.

(57) ABSTRACT

There is provided a configuration enabling prevention in advance of leakage and outflow of secret information in the local network, such as private data and content whose copyright and use right is restricted. A plurality of identification information of a communication destination device are acquired at different data processing levels. Identification information acquired by data processing at a level of a physical layer or a data link layer of the OSI reference model and identification information acquired by data processing at a layer level of a network layer or higher are received and these identification information are matched.

9 Claims, 11 Drawing Sheets

U.S. PATENT DOCUMENTS

| | | |
|---|---|---|
| 2004/0158634 A1 | 8/2004 | Saito et al. |
| 2004/0268153 A1* | 12/2004 | Goldthwaite et al. ........ 713/202 |
| 2005/0022015 A1* | 1/2005 | Van Den Heuvel et al. . 713/201 |

FOREIGN PATENT DOCUMENTS

| | | |
|---|---|---|
| JP | 10-149338 | 6/1998 |
| JP | 2000-201143 | 7/2000 |
| JP | 2001-285284 | 10/2001 |
| JP | 2002-222172 | 8/2002 |
| WO | 00/62505 | 10/2000 |

\* cited by examiner

COMMUNICATION APPARATUS AND ASSOCIATED METHOD OF CONTROLLING DISTRIBUTION OF CONTENT TO NETWORK DEVICES

TECHNICAL FIELD

The present invention relates to a communication processing apparatus, a communication controlling method and a computer program. More particularly, the present invention relates to a communication processing apparatus, a communication controlling method and a computer program, wherein a process of illegal use of content, such as an outflow of content permitted to be used only in a home network, for example, can be excluded during communications between a device connected to a local network such as a home network and a device connected to an external network such as the Internet, by authenticating both the devices distinguishably.

BACKGROUND ART

Along with recent widespread of data communication networks, so-called home networks allowing communications between household electric appliances, computers and other peripheral apparatuses connected to the network are prevailing also in homes. The home network provides users with convenience and comfort, such as sharing a data processing function between apparatuses connected to the network and transmitting and receiving content to and from the apparatuses, and is predicted to become more common.

On the other hand, however, it is required to consider a countermeasure against illegal accesses in the network of this type. A device in a home network, such as a server, often stores content requiring copyright management, including private content and paid content.

Content and secret information stored in the server in a home network have a possibility of being illegally acquired, for example, by an external access via the Internet. If such an illegal access is allowed, secret is leaked and there arises a severe problem in terms of management of the content copyright.

When content requiring copyright management such as movies and music is transmitted via a network, the content transmission range is limited to a range in which the usage is permitted, for example, only among devices in a home network. However, recent widespread of the Internet poses a problem of illegal content transmission via the Internet.

Under the Copyright Law of Japan, digital content as one of literary works is protected from illegal use such as copying and falsification without permission. Article 30 of the Copyright Law of Japan stipulates that it shall be permissible for a user to copy by himself a work for the purpose of his personal use, family use or other similar uses, without limiting the kind of a work and a type of copying. Article 49, Paragraph (1) of the Copyright Law of Japan also stipulates that if a copy made for the purpose of personal use is used for other purposes, reproduction right of the author is transferred, and prohibits so-called uses of copies for other purposes.

In these days of active uses of digital content, many technologies have been developed to protect copyright. For example, Digital Transmission Content Protection (DTCP), which is the industry standards or digital transmission content protection, defines a mechanism for transmitting content whose copyright is protected. For example, refer to a non-patent document 1 [DTCP Specification Volume 1 Version 1.3 (Informational Version).

The DTCP defines digital content transmission on a home network using IEEE 1394 and the like as a transmission line. It is presumed that content transmission via a home network is of personal use or family use as stipulated in the Copyright Law of Japan. The DTCP defines an authentication protocol between devices during content transmission and a transmission protocol of encrypted content.

Namely, a server as a content provider performs authentication with a client as a content receiver, and encrypts a transmission channel by using a key shared during the authentication procedure, and transmits content. By using the DTCP, content can therefore be transmitted under protection. Since the client cannot acquire an encryption key unless authentication with the server succeeds, the client cannot enjoy the content. [Non-patent document 1] DTCP Specification Volume 1 Version 1.3 (Informational Version).

DISCLOSURE OF THE INVENTION

The present invention has been made in consideration of the circumstances described above, and realizes an authentication configuration which definitely distinguishes between a device connected to a specific local network such as a home network and a device connected to an external network such as the Internet. It is an object of the present invention to provide a communication processing apparatus, a communication controlling method and a computer program capable of preventing an illegal outflow of content, leakage of secret information and the like, by providing the configuration that an authentication process is executed when data such as content is transferred, to confirm that a device is connected to a local network such as a home network.

A first aspect of the present invention is a communication processing apparatus for executing a communication process via a network, which is characterized in that:

a communication process related to an authentication process according to a predetermined authentication method is performed in order to acquire secret information permitted to be disclosed only to devices in a local network corresponding to the authentication method;

unique identification information of a communication destination device in the communication process is acquired by data processing at a network layer or lower of an OSI reference model;

unique identification information of an authentication partner device is acquired in an authentication sequence of the authentication method as data processing at an application layer of the OSI reference model;

the acquired unique identification information of the communication destination device is matched with the acquired unique identification information of the authentication partner device; and in accordance with a passed or failed state of the matching, a process is executed to judge whether the authentication partner device is a device connected to a same local network as a local network to which a local device being a communication source device is connected.

Furthermore, in an embodiment of the communication processing apparatus of the present invention, it is characterized that at least one of the unique identification information received from the authentication partner device is received as processed data generated by an encryption process or a hash value generation process based on secret information shared with the communication source device.

Furthermore, in an embodiment of the communication processing apparatus of the present invention, it is characterized in that the identification information received from the communication destination device is a node unique ID defined in IEEE 1394 standards.

In addition, in an embodiment of the communication processing apparatus of the present invention, it is characterized in that the communication processing apparatus receives, as the identification information received from the communication destination device, identification information acquired from a PHY communication unit of the communication destination device and identification information acquired by a network communication unit of the communication destination device, and matches a plurality of these identification information.

Furthermore, in an embodiment of the communication processing apparatus of the present invention, it is characterized in that the identification information received from the communication destination device is a device address defined in communication standards.

Furthermore, in an embodiment of the communication processing apparatus of the present invention, it is characterized that the communication processing apparatus receives, as the identification information received from the communication destination device, a device address as a source address of a packet transmitted from the communication destination device, and a device address stored in a packet by data processing at the application level or data based on the device address at the application level, and matches a plurality of these device addresses.

A second aspect of the present invention is a communication controlling method for executing a communication process via a network, which is characterized by comprising:

an identification information acquiring step of acquiring unique identification information of a communication destination device in the communication process by data processing at a network layer or lower of an OSI reference model, and acquiring unique identification information of an authentication partner device in an authentication sequence of a predetermined authentication method as data processing at an application layer of the OSI reference model;

a matching processing step of performing a matching of the acquired unique identification information of the communication destination device with the acquired unique identification information of the authentication partner device; and a judging step of judging, in accordance with a passed or failed state of the matching, whether the authentication partner device is a device connected to a same local network as a local network to which a local device being a communication source device is connected.

Furthermore, in an embodiment of the communication controlling method of the present invention, it is characterized in that in the identification information acquiring step, at least one of the unique identification information received from the authentication partner device is received as processed data generated by an encryption process or a hash value generation process based on secret information shared with the communication source device.

In addition, in an embodiment of the communication controlling method of the present invention, it is characterized in that the identification information received from the communication destination device is a node unique ID defined in IEEE 1394 standards.

Furthermore, in an embodiment of the communication controlling method of the present invention, it is characterized in that the identification information acquiring step is a step of receiving, as the identification information received from the communication destination device, identification information acquired from a PHY communication unit of the communication destination device and identification information acquired by a network communication unit of the communication destination device, and the matching processing step matches a plurality of these identification information.

Furthermore, in an embodiment of the communication controlling method of the present invention, it is characterized in that the identification information received from the communication destination device is a device address defined in communication standards.

In addition, in an embodiment of the communication controlling method of the present invention, it is characterized in that the identification information acquiring step receives, as the identification information received from the communication destination device, a device address as a source address of a packet transmitted from the communication destination device, and a device address stored in a packet by data processing at the application level or data based on the device address at the application level, and the matching processing step matches a plurality of these device addresses.

Furthermore, a third aspect of the present invention is a computer program for executing a communication process via a network, which is characterized by comprising:

an identification information acquiring step of acquiring unique identification information of a communication destination device in the communication process by data processing at a network layer or lower of an OSI reference model, and acquiring unique identification information of an authentication partner device in an authentication sequence of a predetermined authentication method as data processing at an application layer of the OSI reference model;

a matching processing step of performing a matching of the acquired unique identification information of the communication destination device with the acquired unique identification information of the authentication partner device; and a judging step of judging, in accordance with a passed or failed state of the matching, whether the authentication partner device is a device connected to a same local network as a local network to which a local device being a communication source device is connected.

It is noted that the computer program of the present invention is, for example, a computer program capable of being supplied to a computer system capable of executing various program codes, in the form of a computer readable storage medium such as a CD, an FD, an MO or communication medium such as a network. By supplying such a program in the computer readable form, processes corresponding to the program can be realized in a computer system.

Other objects, features and advantages of the present invention will become apparent from the detailed description of embodiments of the present invention and accompanying drawings to be given later. In this specification, a system is a logical configuration set of a plurality of apparatuses, and is not limited only to the configuration having constituent devices mounted on the same housing.

According to the configuration of the present invention, in a case where a network such as a home network is accessed by a device connected to an external network such as the Internet, it is possible to definitely judge whether the access is from an external device or from a device in a local network. By executing authentication with judgment of the present invention, it becomes possible to prevent in advance leakage and outflow of secret information in the local network, such as private data and content whose copyright and use right is restricted.

According to the configuration of the present invention, a plurality of identification information of a communication destination device are acquired at different data processing levels. For example, at least one of identification information is received as processed data generated by an encryption process or a hash value generation process based on secret information shared with the communication source device. Identification information acquired by data processing at a level of a physical layer or a data link layer of the OSI reference model and identification information acquired by data processing at a layer level of a network layer or higher are received and a plurality of these identification information are matched. By matching identification information acquired at a plurality of different data processing levels, and in accordance with a satisfied or an unsatisfied state of the matching, it becomes possible to definitely judge whether the communication destination device is a device connected to the same local network as a local network to which a local device being the communication source device is connected. It is possible to prevent in advance leakage and outflow of secret information in the local network, such as private data and content whose copyright and use right is restricted.

According to the configuration of the present invention, comparison/matching is possible by using node unique IDs in conformity with the IEEE 1394 standards or Bluetooth device addresses in conformity with the Bluetooth standards, so that identification information already set for already existing communications can be utilized.

BEST MODES FOR CARRYING OUT THE INVENTION

In the following, with reference to the accompanying drawings, detailed description will be made on a communication processing apparatus, a communication controlling method and a computer program according to the present invention.

Figure 1:
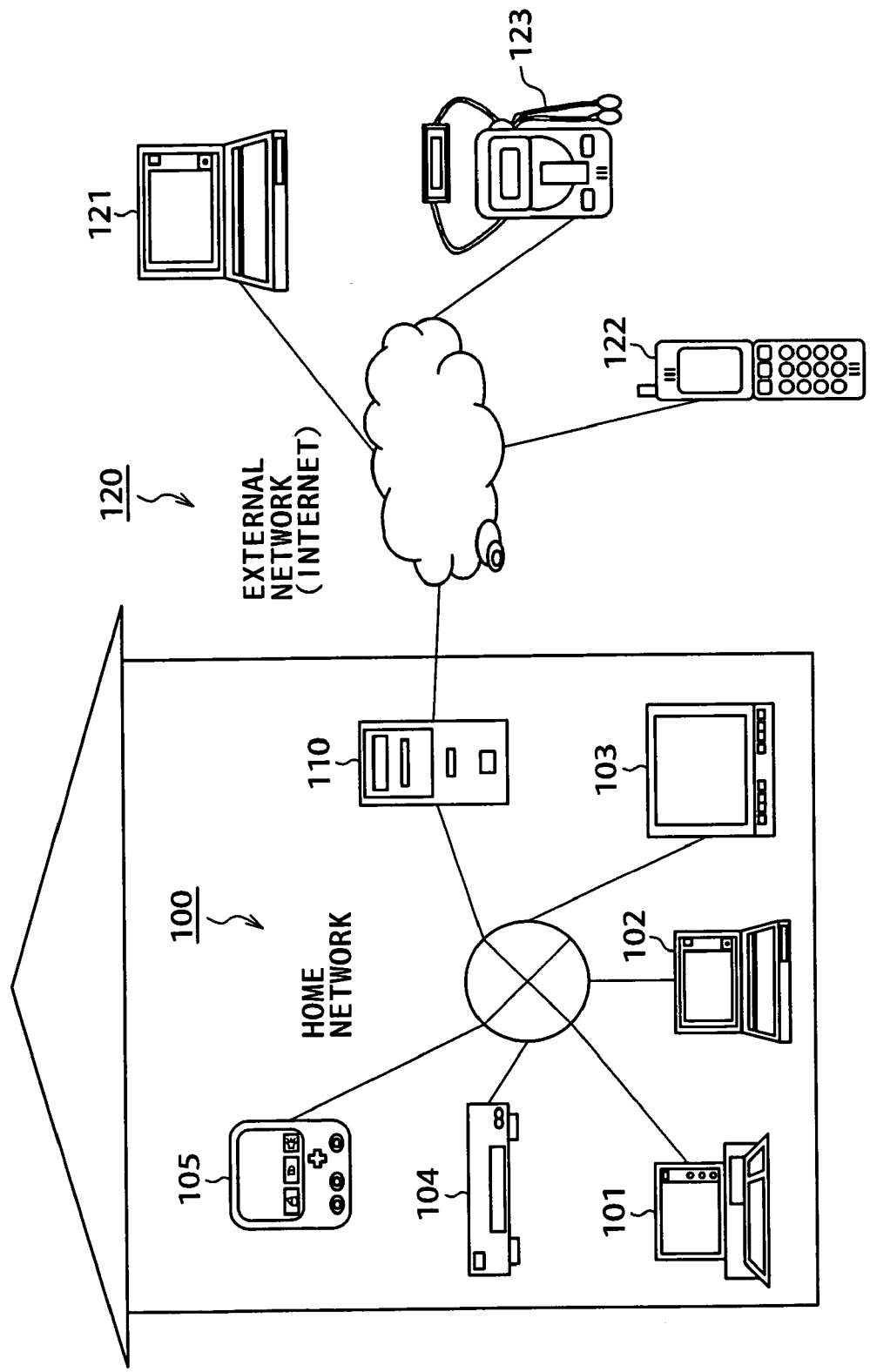
FIG. 1 is a view for explaining a network configuration example.

First, with reference to FIG. 1, description will be made on an example of a network configuration to which the present invention can be adopted. FIG. 1 shows a local area network, i.e., an internal network, such as a home network 100 configured in a house or the like of a particular user. Various information processing apparatuses, such as personal computers (PCs) 101 and 102, a TV 103, a hard disk recorder 104, and a PDA 105, execute data transmission/reception via the home network 100.

For example, the PC 101, the PC 102, or the hard disk recorder 104 is used as a content provider server, and the TV 103 and the PDA 105 are used as clients. A client acquires content stored in the server via the network and outputs the content by using a display and a speaker of the client.

The home network 100 is either a wired network or a wireless network. Each device connected to the network transmits/receives a communication packet via the network.

In FIG. 1, the home network 100 is connected to an external network 120 such as the Internet. Connected also to the external network 120 are various communication processing apparatuses, such as a PC 121, a mobile phone 122, and a portable reproduction player 123. The communication processing apparatus in the home network 100 can communicate with the communication processing apparatus in the external network 120 via the home network 100 and the external network 120.

A communication server 110 is connected between the external network 120 and the internal network constituted of the home network 100. The communication server 110 executes data processing allowing communications between the external network 120 and the internal network. For example, the data processing includes packet conversion between an IEEE 1394 packet as a data communication packet in the home network and an Ethernet packet and an IP packet as a transfer packet in the external network.

In a conventional system which allows content acquisition if authentication between devices succeeds, various communication processing apparatuses connected to the external network 120, such as the PC 121, the mobile phone 122 and the portable reproduction player 123, can access via the communication server 110 the server in the home network 100, e.g., the PC 101, the PC 102 or the hard disk recorder 103, acquire content stored in each of these apparatuses, and output the content from the PC 121, the mobile phone 122, the reproduction player 123 or the like.

However, permitting undefined clients to acquire content is not proper in view of the problems such as content copyright and secret leakage. Therefore, for communications between devices, the configuration is adopted in which an authentication process is executed in accordance with an authentication sequence of the present invention to be described later, in order to prevent an illegal outflow of data in the internal network. The detailed processing configuration will be later given.

Figure 2:
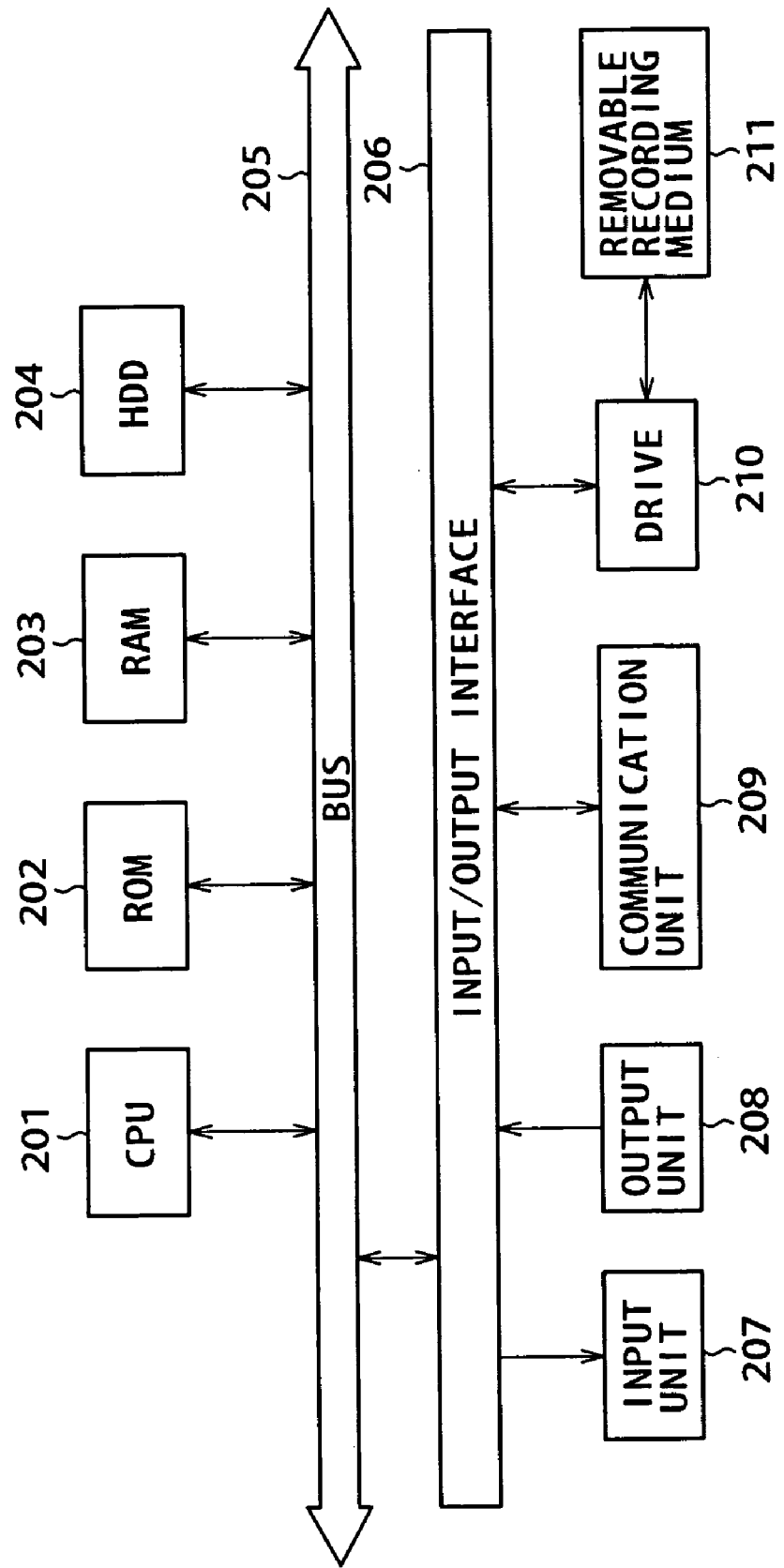
FIG. 2 is a view for explaining a configuration of a communication processing apparatus.

With reference to FIG. 2, description will be made on an example of the hardware structure of a communication processing apparatus as each network-connected device shown in FIG. 1.

A CPU (Central Processing Unit) 201 executes various processes in accordance with programs stored in a ROM (Read Only Memory) 202, an HDD (Hard Disk Drive) 204, or the like, and functions as data processing means or communication control processing means. A RAM (Random Access Memory) 203 stores programs to be executed by the CPU 201 and data when necessary. The CPU 201, the ROM 202, the RAM 203 and the HDD 204 are interconnected by a bus 205.

An input/output interface 206 is connected to the bus 205. Connected to the input/output interface 206 are an input unit 207 constituted of a keyboard, switches, buttons, a mouse and the like to be operated by a user, and an output unit 208 constituted of an LCD, a CRT, a speaker and the like to provide various information to the user. Also connected to the input/output interface 206 are a communication unit 209 functioning as data transmission/reception means, and a drive 210 capable of mounting a removable recording medium 211 such as a magnetic disk, an optical disc, an magneto-optical disc and a semiconductor memory and reading or writing data from or to the removal recording medium 211. The communication unit 209 has the structure that communication processing is possible in accordance with, e.g., the IEEE 1394 standards and the Bluetooth standards.

The structure shown in FIG. 2 is the structure of a general PC as one example of the network-connected devices shown in FIG. 1. The network-connected device is not limited only to the PC, but it may be structured by using, as shown in FIG. 1, a portable communication terminal such as a mobile phone and a PDA, or various electronic apparatuses and communication processing apparatuses. Therefore, each device may have a hardware structure specific to it and executes a process in accordance with the hardware.

In communications between devices to be performed by the communication processing apparatus of the present invention, first, an authentication process is executed between devices, and in a case where an authentication process result confirms that the communication partner is a device connected to the same local network such as a home network, it is permitted to transfer data such as content. In the authentication process, unique identification information capable of unanimously discriminating a communication destination device is acquired at a plurality of different data processing levels, and a matching is performed between the plurality of acquired identification information. In accordance with whether the matching is successful or unsuccessful, it is judged whether the communication destination device is connected to the same local network as the local network to which a local device being the communication source device is connected.

In one particular example, an identifier (ID) of a communication device is acquired through communications at a physical layer of a data link layer of the OSI reference model and at a level of a network layer or higher, e.g., at an application layer, and these two IDs are matched. In the following, description will be made on particular examples of the authentication process of the present invention: an example of the configuration for communications in conformity with the IEEE 1394 standards and an example of the configuration for communications in conformity with the Bluetooth standards.

(1) Example of Configuration for Communications in Conformity with IEEE 1394 Standards A communication processing apparatus connected to a local network such as a home network has an IEEE 1394 data interface and executes data transfer in accordance with the IEEE 1394 standards. The IEEE 1394 data interface has a higher data transfer rate than that of, for example, SCSI, and can perform isochronous communications which guarantee that a necessary amount of data can be transmitted/received periodically. Therefore, the IEEE1394 data interface is effective for real time transfer of stream data such as Audio/Video (A/V) data.

The data transfer method by IEEE 1394 includes the above described isochronous communication method and an asynchronous communication method for asynchronous communications. Generally, the isochronous communication method is used for data transmission/reception and the asynchronous communication method is used for transmission/reception of various control commands. Transmission/reception according to these two communication methods can be performed by using a single cable.

A data transmission system allowing electronic devices to transmit/receive data can be configured by interconnecting the devices such as various digital AV devices and personal computers via a data bus in conformity with the digital data interface standards such as those of the Institute of Electrical Engineers 1394 (IEEE 1394).

An AV system of this type can perform so-called remote control. For example, as a disc recording/reproducing apparatus and a personal computer are connected by a data bus, the personal computer side can perform recording/reproducing of the data recording/reproducing apparatus as well as record source editing.

Figure 3:
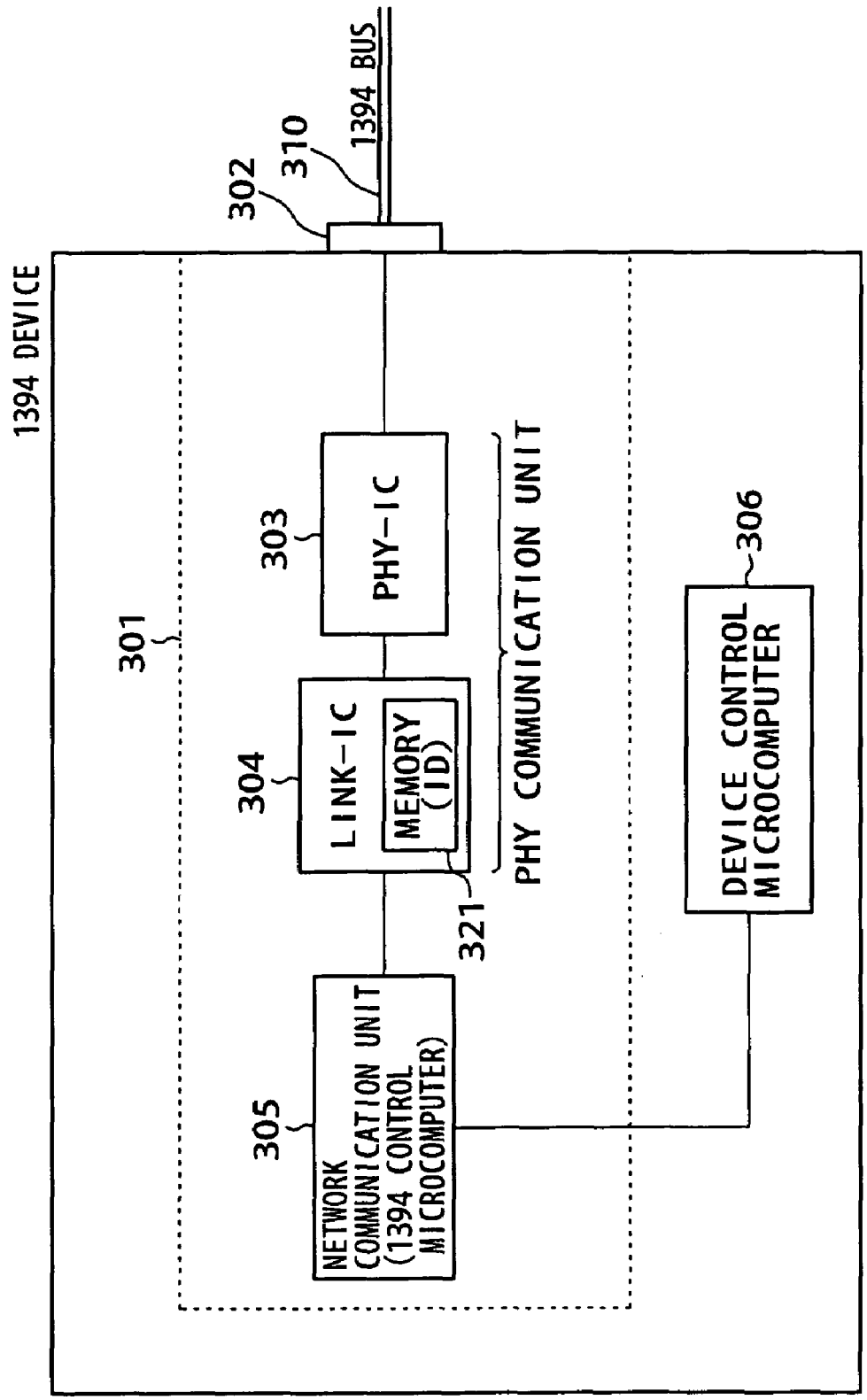
FIG. 3 is a view for explaining a configuration of IEEE 1394 equipment.

With reference to FIG. 3, description will be made on the structure of an IEEE 1394 compatible device as the communication processing apparatus of the present invention.

A transceiver unit 301 has therein a PHY-IC 303, a LINK-IC 304 and a network communication unit (IEEE 1394 control microcomputer) 305, respectively as data processing means. The PHY-IC 303 and the LINK-IC 304 are assumed collectively to be a PHY communication unit.

The PHY-IC 303 is in charge of an electric interface at the physical layer, converts data from the LINK-IC 304 into an electric signal of the IEEE 1394 standards, and conversely transmits an IEEE 1394 standards signal to the LINK-IC 304. The PHY-IC 303 executes a bus (cable) state recognition process, a bus initialization process, an arbitration process and the like. Namely, in accordance with the protocol of the IEEE 1394 standards, the PHY-IC 303 controls communications with an IEEE serial bus 310 via an IEEE 1394 terminal 302 to supply the LINK-IC 304 with an isochronous packet obtained by packetizing digital video data and digital audio data supplied from the IEEE 1394 serial bus or an asynchronous packet obtained by packetizing a control signal. The PHY-IC 303 also outputs an isochronous packet and an asynchronous packet supplied from the LINK-IC 304, to the IEEE 1394 serial bus 310.

The LINK-IC 304 is in charge of the data link layer and sends a transmission data packet to the PHY-IC 303 and a packet received from the PHY-IC 303 to the transaction/application layer. Namely, the LINK-IC 304 converts an asynchronous packet supplied from the PHY-IC 303 into a digital signal (command) which the IEEE 1394 control microcomputer 305 can analyze and supplies it to the IEEE 1394 control microcomputer 305, or converts a digital signal supplied from the IEEE 1394 control microcomputer 305 into an asynchronous packet and supplies it to the PHY-IC 303. The LINK-IC 304 also converts an isochronous packet supplied from the PHY-IC 303 into a digital signal and main data (e.g., digital video data, digital audio data) input from a device into an isochronous packet, to supply then to the PHY-IC 303.

The network communication unit (IEEE 1394 control microcomputer) 305 transfers a command supplied from the LINK-IC 304 to a device control microcomputer 306, and generates a response to the command and outputs it to the LINK-IC 304.

In correspondence with a command supplied from the network communication unit (IEEE 1394 control microcomputer) 305, the device control microcomputer 306 controls circuits (not shown) in the device to make them execute various processes.

A memory 321 such as an EPROM is connected to or built in the LINK-IC 304 so that an ID written in the memory 321 can be read. FIG. 3 shows an example that the memory 321 is built in the LINK-IC 304.

The ID stored in the memory 321 has a global unique value at each node of the IEEE 1394 bus. This ID is hereunder called a Node Unique ID (NUID). The LINK-IC 304 and the memory 321 are structured as a package having an anti-tampering structure which provides a high difficulty in alteration of ID and communication content. As specific examples of a method of making difficult to falsify an ID, various structures may be adopted, for example, a structure that the LINK-IC 304 and the memory 321 storing ID are made of one IC, a structure that a communication path is encrypted in order to protect communications between ICs if a plurality of ICs are used; and a structure that IC of a BGA package is used and wiring layers are buried in inner layers of the substrate to prevent access to signals.

The network communication unit (IEEE 1394 control microcomputer) 305 can communicate with a network communication unit of another network connected device via the LINK-IC 304. Each network communication unit can read NUID via its LINK-IC 304.

The 1394 compatible device constructed as above can perform data transmission/reception and communications with another network connected device via the IEEE 1394 serial bus 310. A bus reset of the IEEE 1394 bus occurs upon mount/dismount of a device, and bus initialization is performed upon occurrence of the bus reset. In the bus initialization sequence, an ID for communications is assigned to each device on the bus. This ID is called a node ID. For communications by an asynchronous packet, a node ID of a partner device is loaded in a packet transmission destination field of a packet header, and a node ID of the device itself is loaded in a packet transmission source field.

For example, when VTR as an IEEE 1394 compatible device is made to execute a predetermined function, a personal computer (PC) connected to the IEEE 1394 bus transmits an AV/C command such as play, record and rewind (hereinafter these commands are collectively called AV/C command) for instructing a VTR to execute the predetermined function via the IEEE 1394 serial bus. Namely, a node ID of the VTR is inserted into an asynchronous packet transmission destination field, an AV/C command is inserted into a data field, and then the packet is output.

Upon reception of the AV/C command, the VTR executes the process corresponding to the AV/C command, and outputs a predetermined response to the personal computer (PC) which is the transmission source of the AV/C command.

Figure 4:
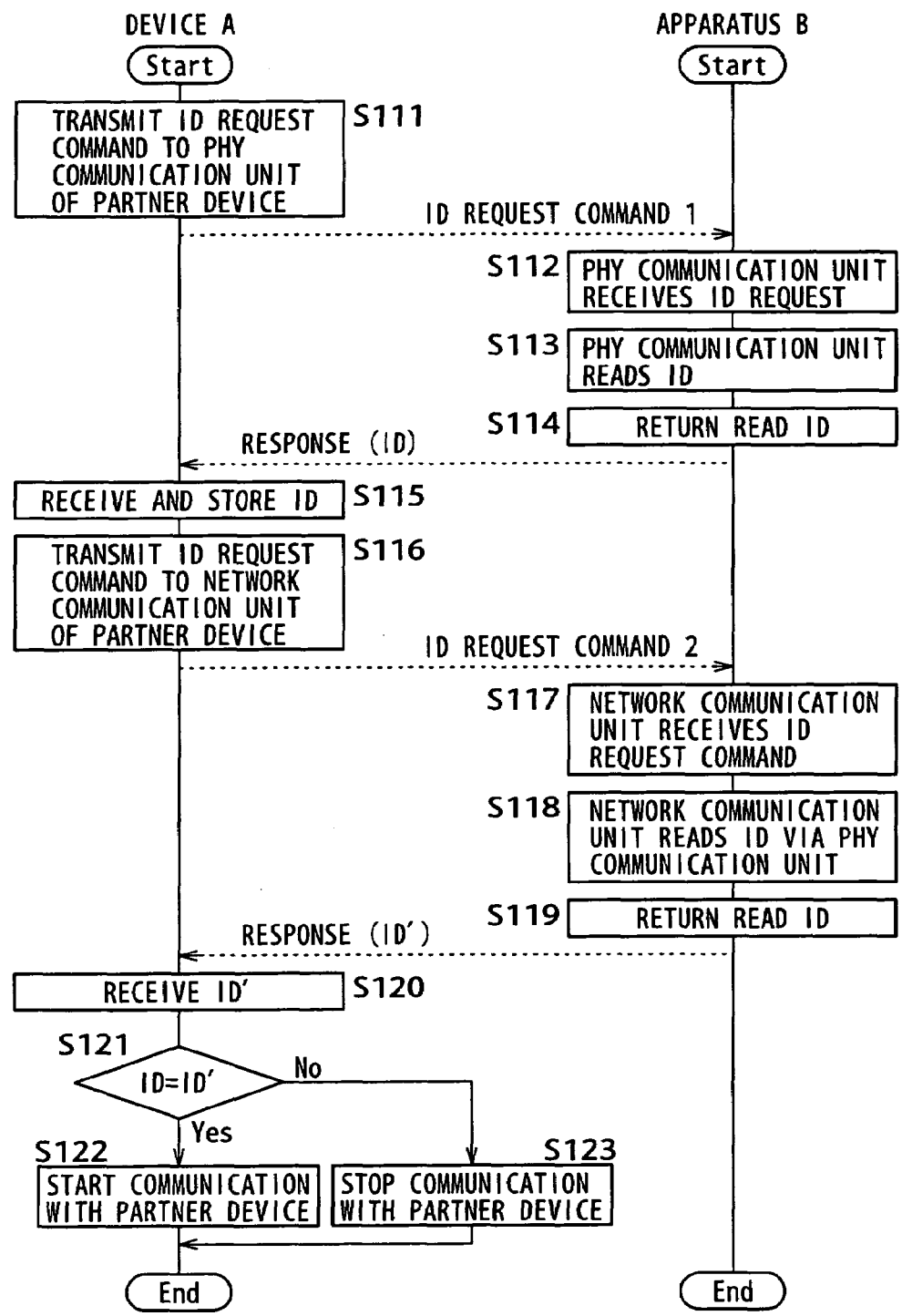
FIG. 4 is a flowchart for explaining an authentication sequence of the present invention.

With reference to FIG. 4, description will be made on an authentication process sequence which is executed for communications between network connected devices.

A flow shown in FIG. 4 illustrates that a device A confirms whether a device B to be communicated is a proper communication partner and controls as to whether communications are permitted. Namely, the device A judges whether the device B is a network connected device in the same home network as that of the device A, or a device connected to the external network such as the Internet. Whether the device B is the internal network connected device or not is judged on an assumption that the devices A and B can deal with the same authentication method and communications between authentication process applications succeed essentially. In other words, the judgment is carried out on an assumption that the devices A and B respectively know the ID (node ID) required for the communication therebetween.

First, at Step S111, the device A sends an ID request command 1 to a PHY communication unit of the partner device B. Upon reception of the ID request at Step S112, the PHY communication unit reads its ID at Step S113 and returns ID to the device A at Step S114. A specific example of realizing this process may be reading out of the NUID in a configuration ROM by using a read transaction of the IEEE 1394 asynchronous communications, which will be described later.

At Step S115, the device A receives an ID from the PHY communication unit of the device B and stores it for later processes. The above-described communications are assumed to be performed at the data link layer or lower of the OSI reference model and be able to be performed only by network connected devices without involving a bridge or router.

Next, at Step S116, the device A sends an ID request command 2 to the network communication unit of the device B. Upon reception of the ID request command 2 at Step S117, the network communication unit of the device B reads its ID (NUID) via its PHY communication unit at Step S118 and returns the read ID to the device A at Step S119. These communications are assumed to be performed at the network layer or higher of the OSI reference model and be able to be performed relative to the devices via a bridge or router. ID obtained by these communications is thereafter called ID'.

A specific example of realizing this process may be that a NUID request command is configured by using an AV/C command defined in the specification of the 1394 Trade Association. For example, if this process is realized by expanding an authentication command of the DTCP standards of an IEEE 1394 protection system using a security command, communications for the ID request and response are executed between the authentication processing units (applications) of the devices in conformity with the DTCP standards.

Upon reception of an ID' from the network communication unit of the device B at Step S120, the device A confirms at Step S121 whether the received ID' is coincident with the ID previously received from the PHY communication unit of the device B.

In a case of coincident, i.e., in a case where ID=ID' is satisfied, the flow advances to Step S122 whereat communications with the partner device are permitted to continue the communications. On the other hand, in a case of not coincident, i.e., in a case where ID=ID' is not satisfied, the flow advances to Step S123 whereat the subsequent communications are prohibited.

Communications between devices may be performed under the condition protected by a process based on secret data shared by both the devices, in order to prevent falsification and identity theft during communications. For example, encryption, an electronic signature of communication content, a keyed hash value of a communication content or the like may be adopted. As a specific algorithm for encryption and an electronic signature, both a common-key cryptographic scheme and a public-key cryptographic scheme may be adopted.

Figure 5:
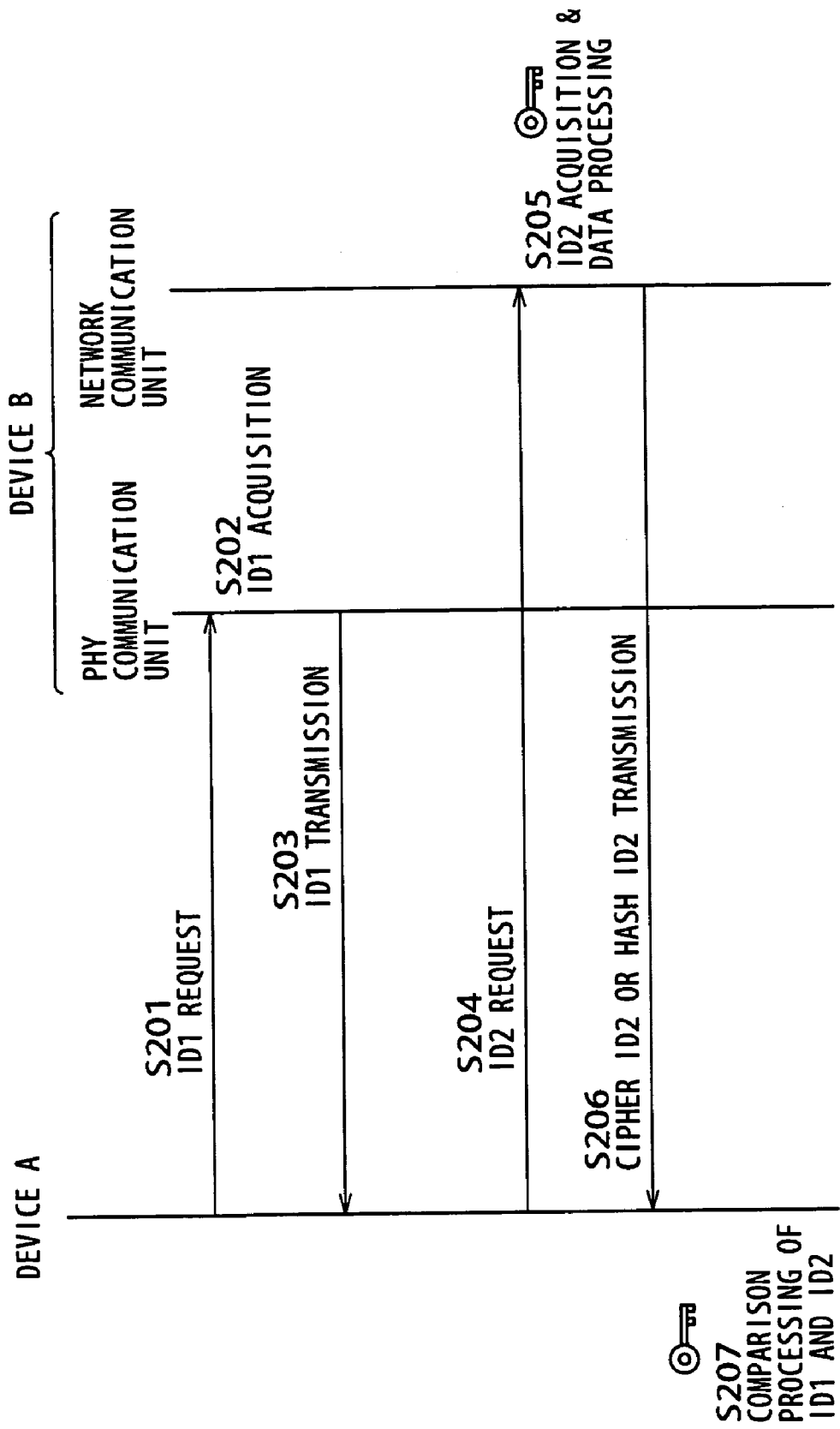
FIG. 5 is a sequence diagram for explaining the authentication sequence of the present invention.

With reference to FIG. 5, description will be made on the configuration that when an ID is transmitted from the network communication unit, an acquired ID is processed by an encryption process using a key as secret information possessed only by particular authorized devices or a hash value generation process, and the ID as encrypted data or a hash value is transmitted.

At Step S201, a device A sends an ID request command 1 to a PHY communication unit of a partner device B. Upon reception of the ID request, the PHY communication unit of the device D reads its NUID at Step S202, and returns it as ID1 to the device A at Step S203.

The device A receives the ID from the PHY communication unit of the device B and stores the received ID for later processes. Next, at Step S204, the device A sends an ID request command 2 to the network communication unit of the device B. Upon reception of the ID request 2, at Step 205, the network communication unit of the device B reads, via its PHY communication unit, the ID (NUID) stored in the memory, and makes the read ID be subjected to an encryption process using secret data shared by the devices A and B, i.e., an encryption process key, or to a hash value generation process using secret data shared by the devices A and B, i.e., a hash value generation key. At Step S206, the generated data is transmitted as ID2 to the device A.

In a case where the received ID2 is encrypted data, the device A executes a decryption process by using the key shared with the device B and compares the decrypted ID2 and the ID1 previously received from the PHY communication unit. If both are coincident, it is judged that the device which transmitted the ID1 is the same as the device which transmitted the ID2 and that communications are being performed with the internal network connected device capable of communicating with the PHY communication unit, to thereafter perform subsequent communications, e.g., content provision. In a case where the ID1 is not coincident with the ID2, the device which transmitted the ID1 is not the device which transmitted the ID2. Namely, it is judged that ID1 was supplied to the device A from the internal network connected device capable of communicating with the PHY communication unit and that ID2 was transmitted to the device A from a device connected to an external network such as the Internet, and it is judged that there is an illegal external access. Subsequent communications, e.g., content provision, is stopped.

In a case where the received ID2 is a hash value, the device A generates a hash value of ID1 previously received from the PHY communication unit, by using the hash value generation key shared with the device B, and compares the obtained hash value of the ID1 with the hash value of the ID2 received from the network communication unit of the device B. If both are coincident, it is judged that the device which transmitted the ID1 is the same as the device which transmitted the ID2 and that communications are performed with the internal network connected device capable of communicating with the PHY communication unit, to thereafter perform subsequent communications, e.g., content provision. In a case where the both are not coincident, similar to the above-described operation, it is judged that there is an illegal external access. Subsequent communications, e.g., content provision, is stopped.

In the above description, although a case where hash based on a secret common key is used has been exemplified, an electronic signature based on the public key infrastructure (PKI) may also be used. In this case, the device B obtains an electronic signature by using its private key and sends the electronic signature to the device A in place of the hash value. The device A verifies the validity of the electronic signature by using a public key of the device B received from the device B.

By executing the authentication process of the present invention described above, it is possible to distinguish between the device connected to the local network and the device connected to the external network and to exclude an illegal access via the external network.

Figure 6:
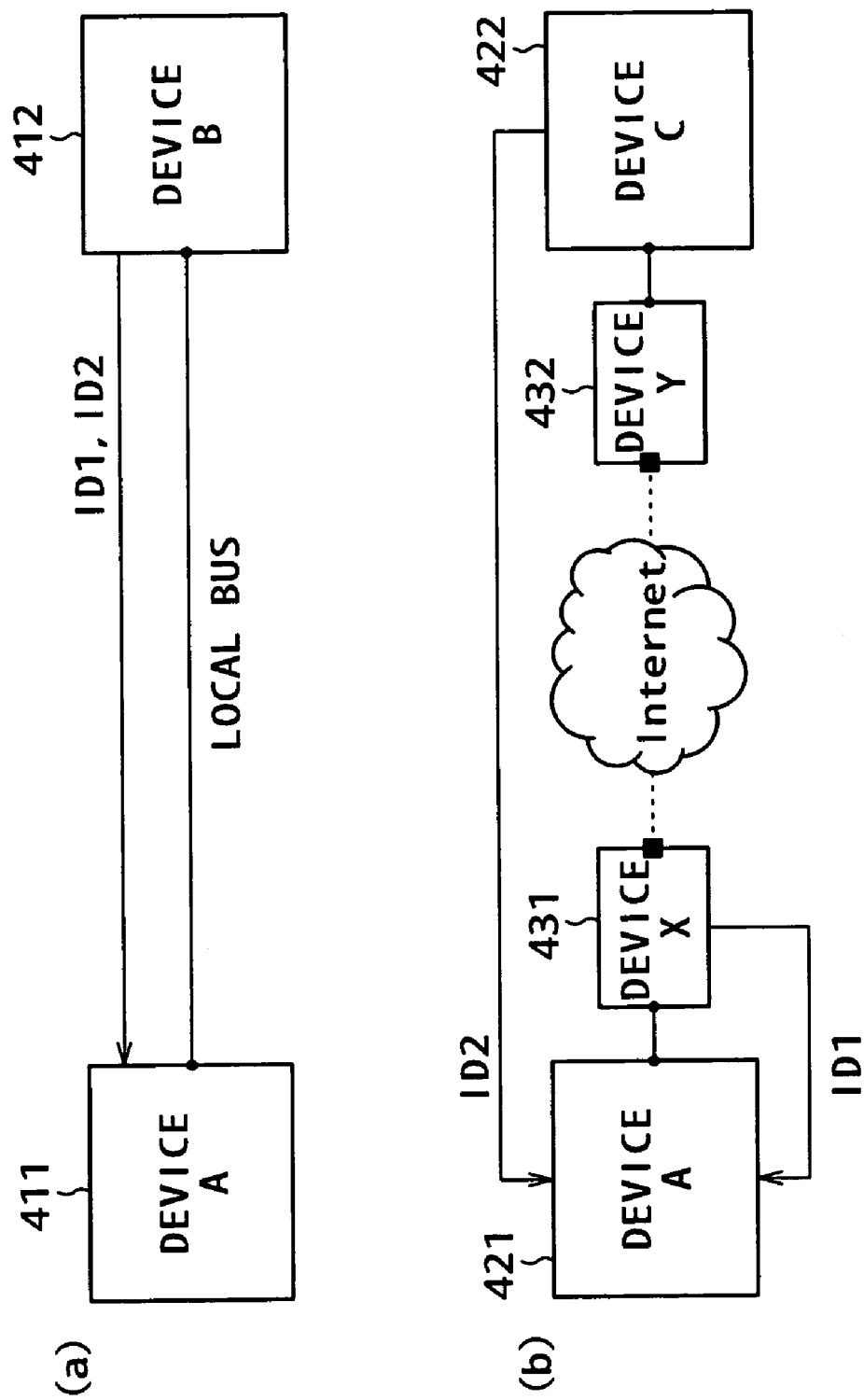
FIG. 6 is a view for explaining an ID acquisition process and an effect thereof according to the authentication sequence of the present invention.

More specifically, in a case where a device A 411 and a device B 412 are connected to a local bus as shown in FIG. 6(*a*), and the device A 411 and the device B 412 use the authentication method of the present invention, the ID received by the device A 411 from the device B 412 during the above-described sequence satisfies ID1=ID2. However, in a case where a device A 421 and a device C 422 use the authentication method of the present invention but the device C 422 is not connected to the same local bus as that of the device A 421, as shown in FIG. 6(*b*), the device A 421 and the device C 422 communicate with each other via a device X 431 and a device Y 432. It is herein assumed that the device X 431 not supporting the authentication method of the present invention impersonates the device C 422. In order to disguise as if the device C 422 locates at the potion of the device X 431, the device X 431 sends its node ID to the device A 421, naming the node ID as a communication ID of the device C 422. Namely, the device X 431 sends authentication application data destined from the device A 421 to the device C 422, to the device Y 432, and the device Y 432 sends it to the device C 422. The device Y 432 sends authentication application data destined from the device C 422 to the device A 421, to the device X 431, and the device X 431 sends it to the device A 421. In a case where the above-described authentication sequence is executed by connecting the device A 421 to the device C 422 connected to the external network, the device A 421 receives the ID1 from the PHY communication unit of the local network connected device X 431, and the ID2 from the network connection unit of the device C 422. In this case, the ID1 is the NUID of the device X 431 and the ID 2 is the NUID of the device C 422 so that the ID1=the ID2 is not satisfied, and the device A 421 judges that there is an access from an external network connected device and can terminate the communications.

As described earlier, IEEE 1394 stipulates that the configuration ROM has a node unique ID (NUID) of 64 bits. This ID can be referred to directly through the asynchronous communications defined in IEEE 1394. Generally, processing the information of the node unique ID is completed only in an IC of IEEE 1394. In the device having the IC of IEEE 1394, if it is possible to read the node unique ID from an IC other than the IC, for example, the CPU via the IC of IEEE 1394, the ID can be transferred by a method other the above-described direct reference method. For example, the ID can be transmitted/received as encrypted data using the secret key shared by two devices, as described earlier.

The process of the present invention is executed by the IEEE 1394 devices on an assumption that a 1394 bus ID of 10 bits are all set to 1 and communications are not performed with a device on a different bus via a bridge, because the communication partner is limited to only devices within a 1394 local bus.

However, as shown in FIG. 6(*b*) described above, if the device X 431 impersonates the device C 422 and the device X 432 impersonates the device A 421, an application protocol using a command such as an AV/C command allows communications traversing a local bus. In order to prevent this, the device A 421 accesses the configuration ROM of the communication partner on the local bus to directly refer to the node unique ID (NUID) and also acquires the NUID by the above-described application protocol. In this case, the device A 421 can only refer to the configuration ROM of the device X 431 on the local bus. The device A 421 refers to the node unique ID (NUID) of the device 431 and acquires the NUID of the device C 422 via the devices Z 431 and Y 432, because the device performing communications with the device A 421 on the basis of the common secret data is the device C 422. These IDs are not coincident so that the device A 421 detects that the device C is not on the local bus and relayed communications can be prevented.

(2) Example of Configuration for Communications in Conformity with Bluetooth Standards Next, description will be made on an example of the configuration for communications in conformity with the Bluetooth standards by a communication processing apparatus connected to a local network such as a home network.

Recently, Bluetooth has been paid attention as a wireless communication means in short distances and various devices supporting Bluetooth have been developed and on sale.

As compared with conventional infrared data communications such as those of Infrared Data Association (IrDA), a Bluetooth wireless communication system has advantages such as no directivity and high transparency. Therefore, although apparatuses performing communications are required properly facing each other when high directivity communications such as those of IrDA are utilized, a communication system such as Bluetooth is free of position restrictions of this kind.

The Bluetooth standards are managed by the Bluetooth SIG Inc. and its details are available by anybody from the Bluetooth SIG Inc. For example, in the communications using Bluetooth, a communication control device called a master broadcasts a device detection message for detecting neighboring devices.

The master can detect the neighboring devices, i.e., communicable devices, from a response message transmitted from each device (slave) received the device detection message.

In a case where the master establishes communications with a particular device among the detected devices, the master identifies the device in accordance with identification information of each device contained in the response message to establish the communications.

In Bluetooth, as the information for identifying each device, information called a Bluetooth device address is assigned to each device. Since this address is inherent (unique) to each device, it is used for various processes such as device management.

Figure 7:
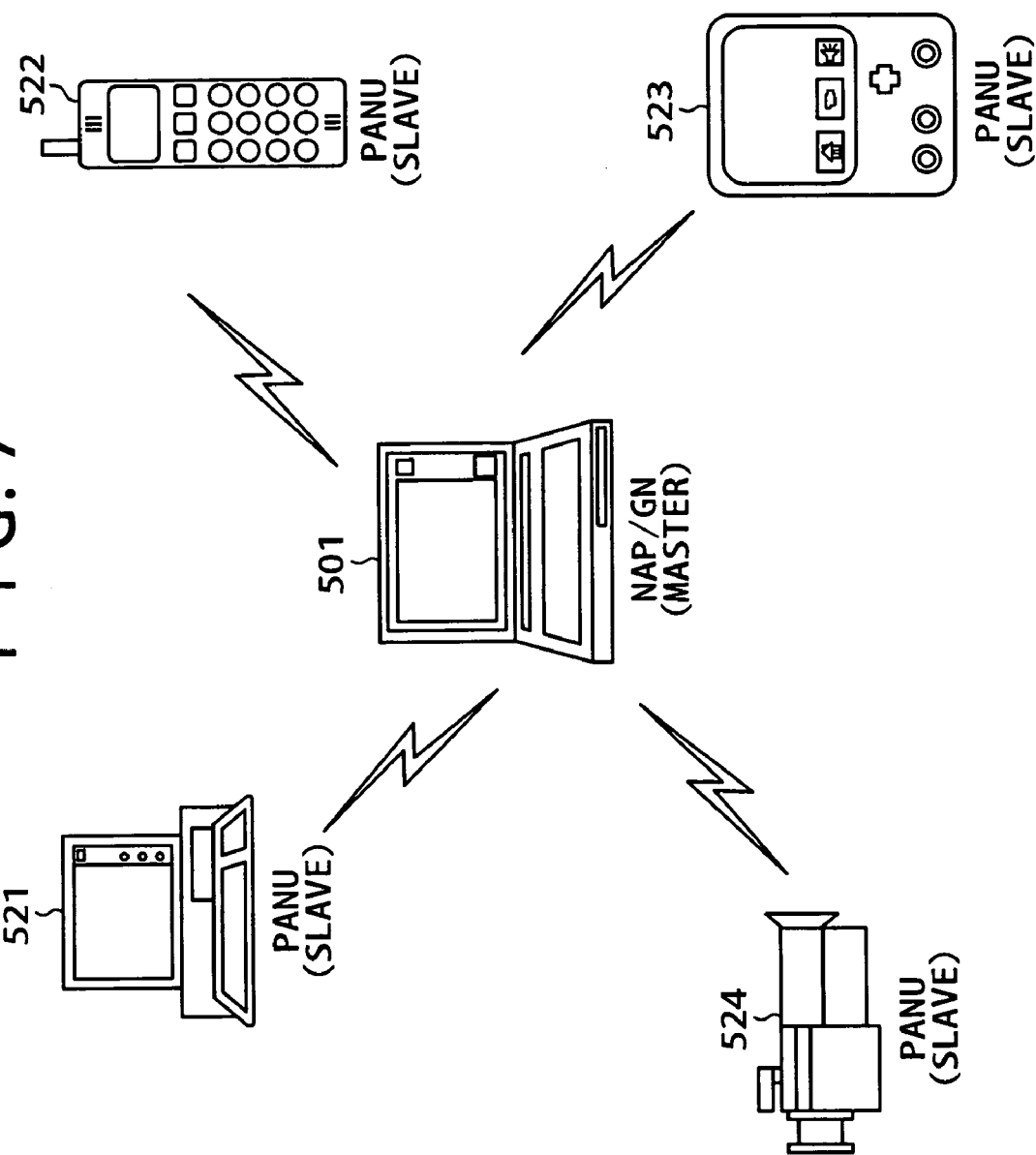
FIG. 7 is a view for explaining a communication network based on the Bluetooth specification.

With reference to FIG. 7, description will be made on an example of a communication system in which various data is transmitted/received between communication processing apparatuses forming a piconet as a wireless communication network in conformity with the Bluetooth standards.

As described above, the Bluetooth communications are performed in a network (piconet) constituted of a communication control device called a master and a plurality of devices called slaves for performing communications via the master. In Bluetooth, as the information for identifying each device, a Bluetooth device address is assigned to each device to identify a communication partner in accordance with the Bluetooth device address.

In the piconet constituted of a master and slaves, seven slaves at a maximum can belong to one master. All devices belonging to the same piconet are in the state that a frequency axis (frequency hopping pattern) and a time axis (time slot) are synchronized.

FIG. 7 shows an example of the configuration in which a personal computer (PC) 501 is set as a master and other devices are set as slaves including a personal computer (PC) 521, a mobile phone 522, a Personal Digital Assistants (PDA) 523 and a video camera 524.

The piconet constituted of a maser and a plurality of slaves may be an independent network (ad hoc mode) not connected to other external networks, or may have a configuration (infrastructure mode) connected via the master to other networks such as the Internet and other piconets.

The piconet is also called a Personal Area Network (PAN), and each slave is called a PAN User (PANU). The master in the configuration (infrastructure mode) connected to another network is called a Network Access Point (NAP) which relays a communication packet between slaves constituting the piconet, i.e., executes a packet exchange process, and exchanges a packet with an externally connected network.

The master in the independent network (ad hoc mode) not connected to another external network relays the communication packet between the salves constituting the piconet and is called a Group Ad-hoc Network (GN).

Bluetooth stipulates the standards called a profile for each service as to data transmitted/received via wireless communications and its communication procedures. The service each device can provide is described in this profile. A Personal Area Network (PAN) profile stipulates the communication method between slaves in the piconet. A device belonging to the piconet configured on the basis of the PAN profile transmits/receives various data by using the piconet as one network.

The personal computer (PC) 501 as the master, the personal computer (PC) 521 as the slave, the mobile phone 522, the PDA 523 and the video camera 524 shown in FIG. 7 have each a built-in Bluetooth module and can transmit/receive various data through wireless communications in conformity with the Bluetooth specifications.

Each device constituting the maser and slaves has the Bluetooth module for performing wireless communications in conformity with the Bluetooth standards. More specifically, the module is used for wireless communications of frequency hopping spectrum spreading communications adopting a time division multiplex system using an ISM band at 2.4 GHz.

Figure 8:
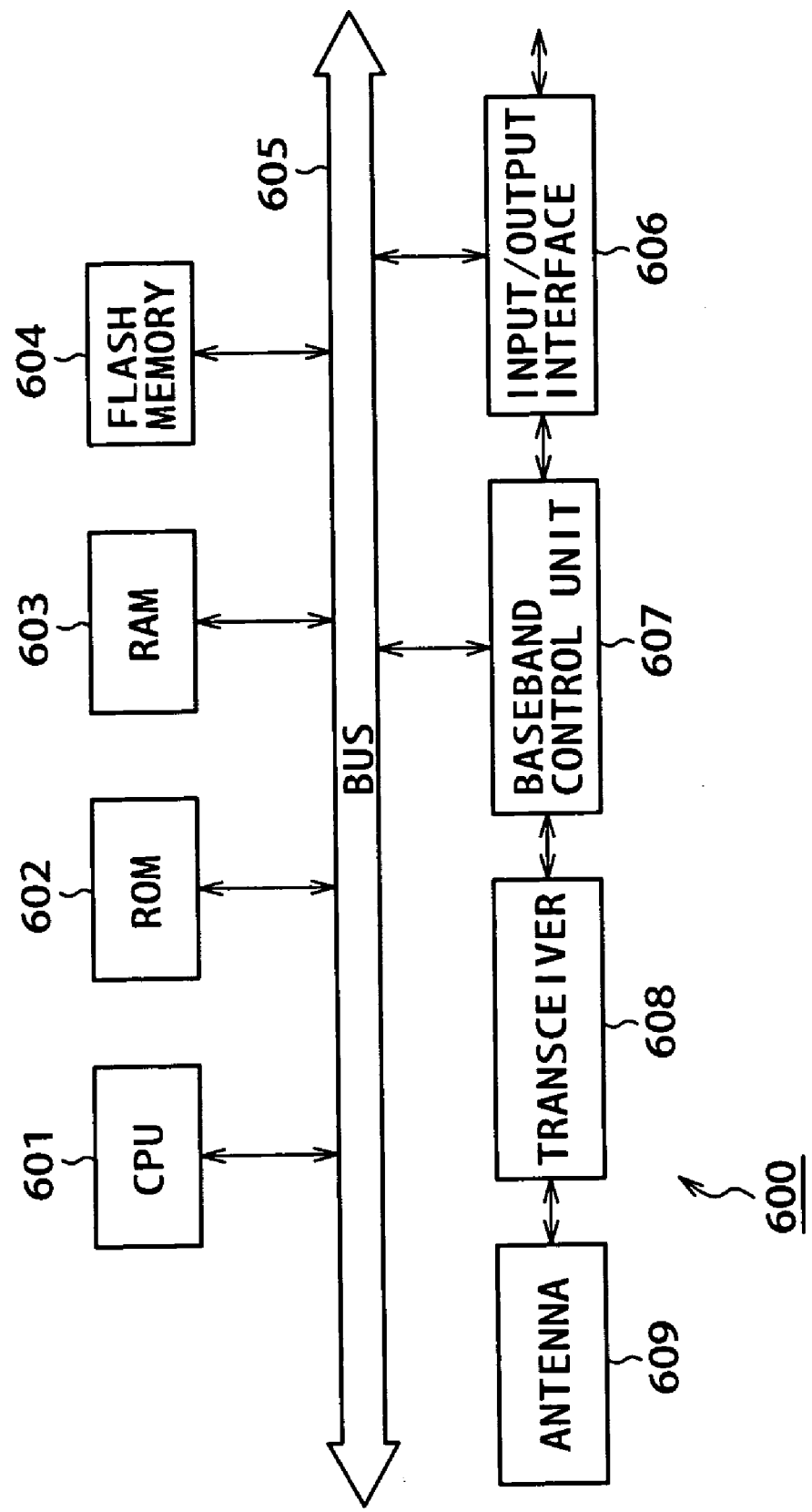
FIG. 8 is a view for explaining a configuration of a Bluetooth device.

With reference to FIG. 8, description will be made on an example of the structure of a Bluetooth module. A CPU 601 deploys a control program stored in a ROM 602 into a RAM 603 to control the whole operation of a Bluetooth module 600. The CPU 601 functions as data processing means or communication control processing means. These CPU 601 through RAM 603 are interconnected by a bus 605 to which a flash memory 604 is connected.

The flash memory 604 stores, for example, a Bluetooth device name, a unique Bluetooth device address and the like set to each Bluetooth device of the maser and slaves constituting the piconet.

The Bluetooth device address is an identifier of 48 bits and inherent (unique) to each Bluetooth device so that it is used for various processes regarding device management.

For example, in order to establish synchronization in the piconet, it is necessary for all slaves to have information of a frequency hopping pattern of the master. The frequency hopping pattern is calculated by each slave by using the Bluetooth device address of the master.

Figure 9:
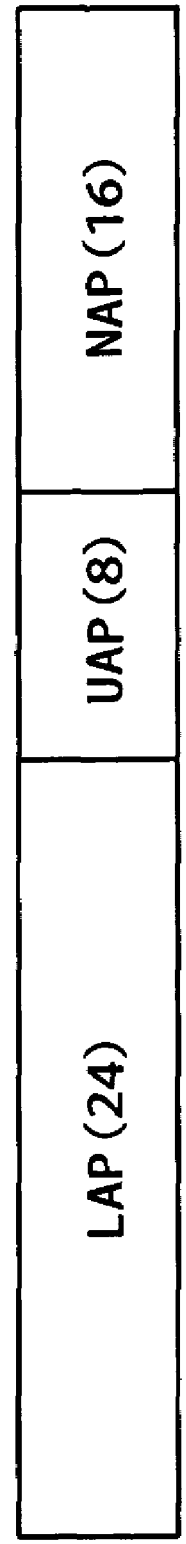
FIG. 9 is a view for explaining a structure of a Bluetooth device address applied in the Bluetooth device communication.

More specifically, as shown in FIG. 9, the Bluetooth device address has the format having separated sections including a Low Address Part (LAP) of 24 bits, an Upper Address Part (UAP) of 8 bits and a Non-significant Address Part (NAP) of remaining 16 bits. The whole 24 bits of the LAP and lower 4 bits of the UAP, 28 bits in total, are used in calculating the frequency hopping pattern.

Each slave can calculate the frequency hopping pattern in accordance with the above-described 28 bits of the Bluetooth device address of the master acquired by "page" for establishing synchronization in the piconet, and a Bluetooth clock notified from the master.

Reverting to FIG. 8, the flash memory 604 stores a link key and the like for authenticating a Bluetooth device of a communication partner after establishing synchronization in the piconet and encrypting transmission data, the link key and the like being supplied to the CPU 601 when necessary.

An input/output interface 606 manages input/output of data supplied in response to an instruction from the CPU 601 and data supplied from a baseband control unit 607.

The baseband control unit 607 performs various controls including a control of a transceiver 608, a link control, a packet control, a logical channel control, a security control and the like, and performs processing such as error correction encoding, decoding or data randomization. The baseband control unit 607 converts data supplied from the input/output interface 606 into analog signals to be output to the transceiver 608, converts a signal supplied from the transceiver 608 into digital signals to be output to the input/output interface 606.

The transceiver 608 is constituted of a Gaussian Frequency Shift Keying (GFSK) modulator unit, a GFSK demodulator unit, a spectrum spreading unit, an inverse spectrum spreading unit, a hopping synthesizer unit and the like. The transceiver 608 performs various processing of a signal supplied from the baseband control unit 607 and outputs the result to an antenna 609, and performs various processing of a signal supplied from the antenna 609 and outputs the result to the baseband control unit 607.

The GFSK modulator unit constituting the transceiver 608 limits the high frequency components of data supplied form the baseband control unit 607 with a filter, performs frequency modulation as primary modulation, and outputs the obtained data to the spectrum spreading unit. The spectrum spreading unit switches a carrier frequency in accordance with the frequency hopping pattern calculated, as described above, from 28 bits including the whole 24 bits of the LAP and lower 4 bits of the UAP and notified from the hopping synthesize unit, performs spectrum spreading of supplied data and outputs the obtained data to the antenna 609. In Bluetooth, the spectrum spreading unit hops the frequency every 625 µsec to transmit data.

The inverse spectrum spreading unit constituting the transceiver 608 hops a reception frequency in accordance with the frequency hopping pattern notified from the hopping synthesizer unit, and for example, acquires a signal transmitted from a communication partner slave. The inverse spectrum spreading unit subjects an acquired signal to inverse spectrum spreading to reproduce a signal from the communication partner slave, and outputs the obtained signal to the GFSK demodulator unit. The GFSK demodulator unit subjects a signal supplied from the inverse spectrum spreading unit to GFSK demodulation, and outputs the obtained data to the baseband control unit 607.

The transceiver 608 transmits a spectrum spread signal to the antenna 609 by using the 2.4 GHz band. The transceiver 608 outputs a signal received at the antenna 609 to the inverse spectrum spreading unit.

Each of the communication processing apparatuses constituting the piconet has a module having the same structure as that of the Bluetooth module 600 shown in FIG. 8 and performs data communications between the respective apparatuses by the process described above.

As described above, in the communication configuration in conformity with the Bluetooth standards, it is defined that each device has a Bluetooth device address (refer to FIG. 9) which is ID of 48 bits. This ID is used for identifying a communication partner in the communications in conformity with the Bluetooth standards.

As described with reference to FIG. 8, generally, the information of a Bluetooth device address is written in a nonvolatile memory (flash memory 604) directly connected to the IC of the Bluetooth module, and can be read by software but cannot be altered.

In the authentication sequence of the embodiment, the Bluetooth device address is received by two different methods, and both are compared. If the both are coincident, it is judged that communications are between local network connected devices, e.g., communications are between devices connected to the same piconet, whereas in a case where the both are not coincident, it is judged that communications are via an external network.

In the process of acquiring a Bluetooth device address, the following two acquisition processes are performed to compare two acquired addresses.

(1) Information of a Bluetooth device address of a communication partner is acquired when the piconet is configured.

(2) A Bluetooth device address is acquired in accordance with a protocol, e.g., a protocol of transmitting a Bluetooth device address by encrypting it with a secret key shared by two devices.

As above, two Bluetooth device addresses are acquired to be matched, including a Bluetooth device address of a communication destination device acquired when the piconet is configured and a Bluetooth device address stored in a packet through data processing at the application level or data based on a Bluetooth device address at the application level.

A receiver device compares the two Bluetooth device addresses received by the above-described two methods, and if the both are coincident, it is judged that communications are between local network connected devices, e.g., communications are between devices connected to the same piconet, whereas in a case where the both are not coincident, it is judged that communications are via an external network.

In a case where communications are performed between devices in conformity with the Bluetooth standards, as shown in FIG. 6(*b*) previously described, the device A 421 and the device C 422 share the secret key, and in a case where the device X 431 impersonates the device C 422 and the device X 432 impersonates the device A 421, communications out of the Bluetooth communication range are possible. In order to prevent this, the device A 421 acquires a Bluetooth device address from a communication partner when the piconet is configured, and acquires a Bluetooth device address protected by encryption or the like by the above-described other protocol.

In this case, as the Bluetooth device address acquired from a communication partner when the piconet is configured, the Bluetooth device address of the device X is set. The device sharing the secret key with the device A is the device C so that the Bluetooth device address of the device C is acquired via the devices X and Y. As incoincidence is judged from a matching between these Bluetooth device addresses, it is judged that the device C does not exist in the Bluetooth local communication range, e.g., it is judged that the device C does not exist in the same piconet. Communications relayed to the external network are stopped so that leak of secret information such as content outflow can be prevented.

(3) Example of Configuration for Communications in Conformity with Internet Protocol Standards Next, description will be made on local communications in conformity with an Internet protocol. A home network configured by Ethernet will be used by way of example.

As a protocol for configuring a home network, for example, UPnP (registered trademark) is presently known. According to UPnP, a network can be configured easily without complicated operations, and content provision service can be made between devices connected to a network without complicated operations and settings. UPnP is independent from an Operating System (OS) and has an advantage that devices can be added easily.

Mutual authentication in UPnP is performed by exchanging a definition file written in the extensible Markup Language (XML) format, between devices connected to a network. The outline of processing of UPnP is given in the following.

(1) Addressing process: an own device ID such as an IP address is acquired;

(2) Discovery process: devices on a network are searched and information such as a device type and function contained in a response received from each device is acquired; and (3) Service request process: service is requested to each device in accordance with the information acquired in the discovery process.

By performing this processing sequence, it becomes possible to provide and receive service by using network connected devices. A device newly added to the network acquires a device ID in the addressing process, and acquires information of other devices connected to the network in the discovery process so that a service request is possible.

In a case where a home network as a local bus is configured by Ethernet, MAC addresses acquired in the following two acquisition processes are compared to judge whether a partner device to be authenticated exists on the local network.

(1) A physical address (MAC address) of Ethernet is obtained from an IP address by using an Address Resolution Protocol (ARP).

(2) For example, a MAC address is acquired by using a protocol of transmitting the MAC address by enciphering it with a secret key shared by two devices.

Figure 10:
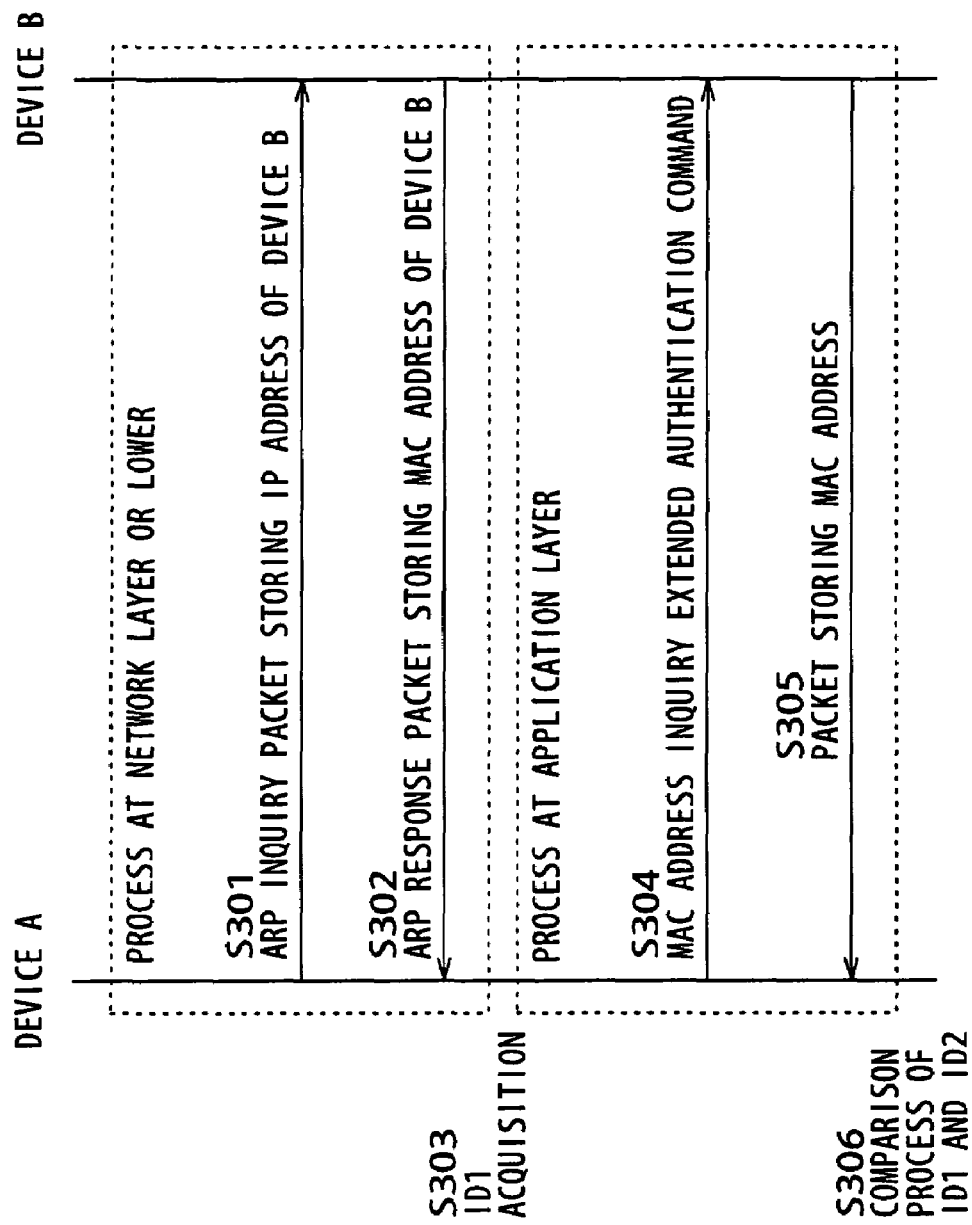
FIG. 10 is a view for explaining a communication sequence in a case of executing a device judgment process based on the present invention in a communication in conformity with the Internet protocol.

With reference to FIG. 10, description will be made on processing of the device A 411 and the device B 412 connected by a local bus as shown in FIG. 6(a).

At Step S301, the device A 411 broadcasts an IP address of the device B 412 entered in an ARP inquiry packet over a network. After referring to the ARP inquiry packet designating an IP address of the device B 412, the device B 412 returns an ARP response packet added with its own MAC address to the transmission source device A 411 (Step S302). The processes at Steps S301 and S302 are executed as the processes at the network layer or lower of the OSI reference model. The device A 411 stores the received MAC address of the device B 412 as ID1 (Step S303).

By extending an authentication command to be used for transmission of encrypted content in an IP network, a MAC address can be inquired between the authentication processing units of devices, i.e., at the application layer. At Step S304, the device A 411 transmits an IP Packet having as transmission data an authentication command extended for MAC address inquiry and as a transmission destination an IP address of the device B 412. Upon reception of the IP packet, the device B 412 processes the authentication command at the authentication processing unit at the application layer to thereby analyze that the command is for MAC address inquiry. At Step S305, the device B 412 returns its MAC address to the device A 411, as a response to the authentication command. The processes at Steps S304 and S305 are executed as the processing at the application layer of the OSI reference model.

The device A 411 stores the MAC address of the device B 412 as the ID2. At Step S306, the device A 411 compares the ID1 and the ID2, and since these values are coincident, it is judged that the device A 411 is connected to the device B 412 via the local bus.

As shown in FIG. 6(b), although the device C 422 does not exist on the same local bus as that of the device A 421, communications via the device X 431 and the device Y 432 allow authentication of the device A 421 and the device C 422 by using the application according to the conventional authentication sequence. The configuration of the present invention can judge this correspondence, i.e., the device A can judge that the device C 422 is not a local network connected device.

It is assumed that the device X 431 functions as a proxy of the device C 422 and that the device A 421 sees the device C 422 as if it exists at the position of the device X 431, i.e., as if it exists on the local network. The device A 421 searches devices on the network by the UPnP discovery process, and acquires the information of a device type, function and the like contained in the response received from each device. In this response, the device X 431 returns, as its information, the information of the device type, function and the like of the device C 422. The device A 421 erroneously judges that the IP address of the device X 431 is the IP address of the device C 422. For authentication between the device A 421 and the device C 422, the device A 421 transmits an IP packet by using the IP address of the device X 431 as a destination. When the device X 431 receives the packet, it rewrites the received packet into a packet destined to the device C 422 and transmits it to the device C 422 via the device Y 432.

Figure 11:
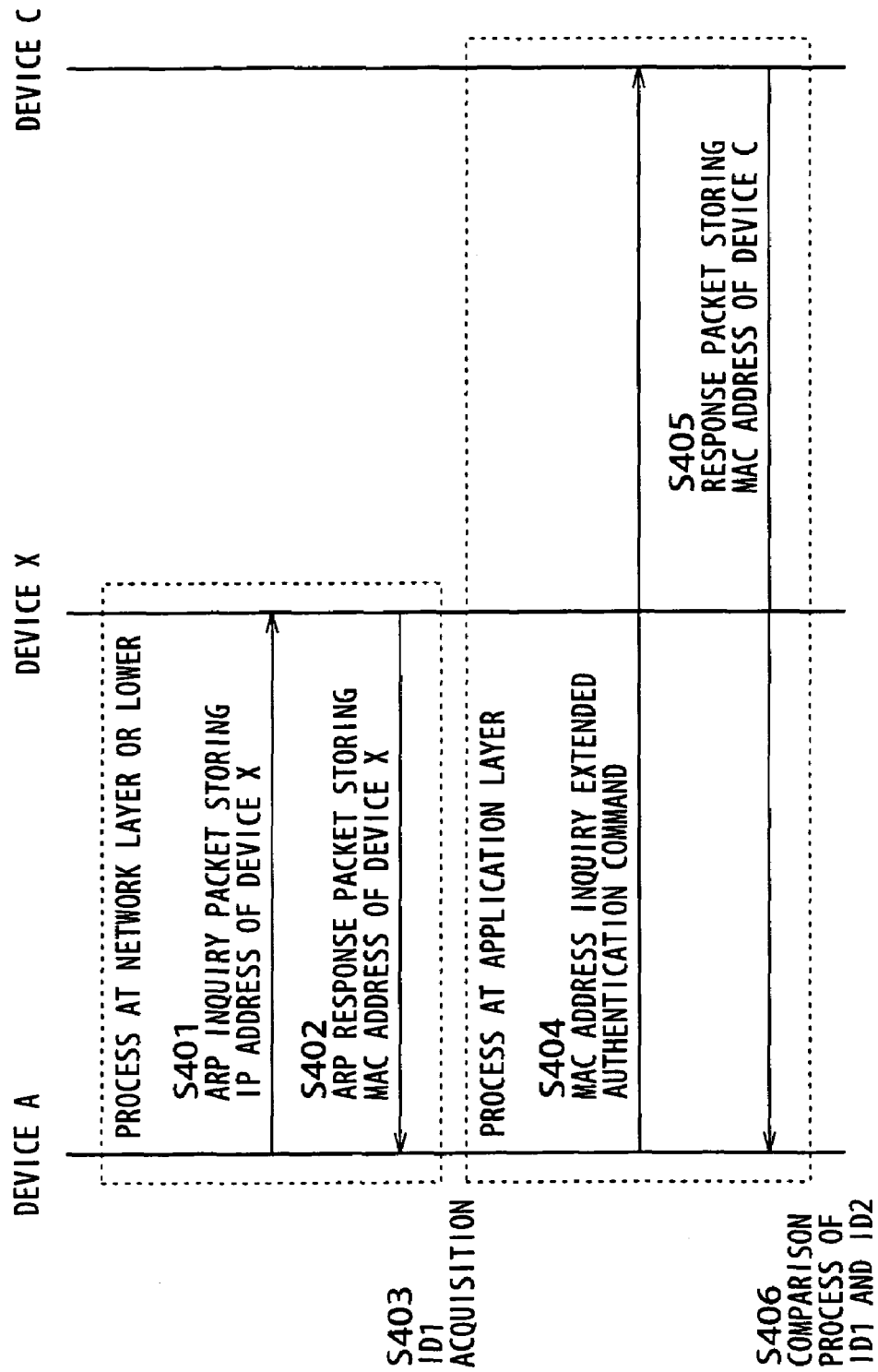
FIG. 11 is a view for explaining the communication sequence in a case of executing a device judgment process based on the present invention in a communication in conformity with the Internet protocol.

With reference to FIG. 11, description will be made of the process sequence of the device A 421 to judge whether the device C 422 exists on the local network.

In order to judge whether the device C 422 exists on the local network, at Step S401 the device A 421 broadcasts an ARP inquiry packet added with the IP address of the device C 422 (actually, the IP address of the device X 431) over the network. After referring to the ARP inquiry packet designating an IP address of the device X 431, the device X 431 returns an ARP response packet added with its own MAC address to the transmission source device A 421 (Step S402). The processes at Steps S401 and S402 are executed as the processes at the network layer or lower of the OSI reference model. At Step S403, the device A 421 stores the received MAC address of the device X 431 as the ID1.

Next, at Step S404, the device A 421 transmits an IP Packet having, as transmission data, an authentication command extended for MAC address inquiry and, as a transmission destination, an IP address of the device X 431. Upon reception of the IP packet, the device X 431 transmits it as an IP packet destined to the device C 422, to the device C 422 via the device Y 432. Upon reception of the IP packet, the device C 422 processes the authentication packet at the authentication processing unit at the application layer to thereby analyze that the command is for MAC address inquiry. At Step S405, the device C 422 returns its MAC address to the device A 421, as a response to the authentication command.

The device A 421 stores the received MAC address of the device C 422 as the ID2. At Step S406, the device A 421 compares the ID1 and the ID2, and since these values are not coincident, it is judged that the device C 422 does not exist on the local network connecting the device A 421.

As described so far, according to the configuration of the present invention, in a case where a network such as a home network is accessed by a device connected to an external network such as the Internet, it is possible to definitely judge whether the access is from an external device or from a device in a local network. It is therefore possible to prevent in advance leakage and outflow of secret information in the local network, such as private data and content whose copyright and use right is restricted.

The present invention has been described in detail in connection with particular embodiments. However, it is obvious that amendments and substitutions of the embodiment can be made by those skilled in the art without departing from the gist of the present invention. Namely, the present invention has been disclosed in illustrative forms and should not be construed limitedly. In order to judge the gist of the present invention, the scope of patent claims should be taken into consideration.

It is noted that a series of processes described in the specification can be realized by hardware, software or a composite structure of hardware and software. If a series of processes are to be realized by software, the program constituting the process sequence is installed in a memory of a computer made of dedicated hardware and the computer executes the program, or the program is installed in a general computer capable of executing various processes and the general computer executes the program.

For example, the program may be recorded in advance in a hard disk or a Read Only Memory (ROM). Alternatively, the program may be temporarily or permanently written in a removable recording medium such as a flexible disc, a Compact Disc Read Only Memory (CD-ROM), a Magneto Optical (MO) disc, a Digital Versatile Disc (DVD), a magnetic disc, and a semiconductor memory. The removable recording medium can be supplied as so-called package software.

The program may be installed into a computer from the removable recording medium described above, wireless transferred into a computer from a download site, wired-transferred into a computer via a network such as a Local Area Network (LAN) and the Internet. The computer receives the transferred program and installs it in a recording medium such as a built-in hard disk.

Various processes described in the specification may be executed not only time sequentially in the order of the description but also parallel or independently without being processed time sequentially. In this specification, a system is the logical configuration set of a plurality of apparatuses, and is not limited only to the configuration having constituent devices mounted on the same housing.

INDUSTRIAL APPLICABILITY

As described above, according to the configuration of the present invention, in a case where a network such as a home network is accessed by a device connected to an external network such as the Internet, it is possible to definitely judge whether the access is from an external device or from a device in a local network. It is therefore possible to prevent in advance leakage and outflow of secret information in the local network, such as private data and content whose copyright and use right is restricted. The present invention can be adopted as an authentication sequence to be executed by a device in a system in which data required to be prevented from leakage, such as content whose copyright is to be managed and private content, is used only in a local network.

DESCRIPTION OF REFERENCE NUMERALS 100 home network
101 PC
102 PC
103 TV
104 hard disk recorder
105 PDA
120 external network
121 PC
122 mobile phone
123 portable reproduction player
201 CPU (Central Processing Unit)
202 ROM (Read Only Memory)
203 RAM (Random Access Memory)
204 HDD (Hard Disk Drive)
205 bus
206 input/output interface
207 input unit
208 output unit
209 communication unit
210 drive
211 removable recording medium
301 transceiver unit
302 IEEE 1394 terminal
303 PHY-IC (PHY communication unit)
304 LINK-IC
305 network communication unit (IEEE 1394 control microcomputer
306 device control microcomputer
310 1394 bus
411 device A
412 device B
421 device A
422 device C
431 device X
501 personal computer (PC)
521 personal computer (PC)
522 mobile phone
523 PDA (Personal Digital Assistants)
524 video camera
600 Bluetooth module
601 CPU
602 ROM
603 RAM
604 flash memory
605 bus
606 input/output interface
607 baseband control unit
608 transceiver
609 antenna

The invention claimed is:

1. A communication processing apparatus comprising:
a central processing unit to execute communication processes via a network;
a communication unit configured to implement a communication process related to an authentication process according to a predetermined authentication method, the communication process being performed in order to acquire secret information permitted to be disclosed only to devices in a local network corresponding to said predetermined authentication method; unique identification information of a communication destination device in said communication process is acquired by data processing at a network layer or lower of an open system interconnection (OSI) reference model; unique identification information of an authentication partner device is acquired in an extended authentication sequence of said predetermined authentication method upon execution of a process command at an application layer of the OSI reference model, the application layer process command being provided within a packet of the authentication process that is processed at the network layer or lower of the OSI reference model; said acquired unique identification information of said communication destination device is compared with said acquired unique identification information of said authentication partner device; and based upon a successful match resulting from the compared unique information, a process is executed to judge whether said authentication partner device is a device connected to the same local network as a local network to which a local device being a communication source device is connected; wherein said unique identification information received from said communication destination device is a node unique ID defined in IEEE 1394 standards; and wherein said communication processing apparatus is configured to receive, as said unique identification information received from said communication destination device, identification information acquired from a PHY communication unit of said communication destination device and identification information acquired by a network communication unit of said communication destination device, and compare said identification information acquired from the PHY communication unit of said communication destination device and the identification information acquired by the network communication destination device.

2. The communication processing apparatus as claimed in claim 1, wherein at least one of said unique identification information received from said authentication partner device is received as processed data generated by an encryption process or a hash value generation process based on secret information shared with said communication source device.

3. The communication processing apparatus as claimed in claim 1, wherein said unique identification information received from said communication destination device is a device address defined in communication standards.

4. The communication processing apparatus as claimed in claim 1, wherein said communication processing apparatus is configured to receive, as an identification information received from said communication destination device, a device address as a source address of a packet transmitted from said communication destination device, and a device address stored in a packet by said data processing at said application layer or data based on the device address at the application layer, and compare said device address as said source address of said packet and said device address stored in the packet.

5. A communication controlling method comprising:
a central processing unit to execute communication processes via a network;
acquiring unique identification information of a communication destination device in a communication process by data processing at a network layer or lower of an open system interconnection (OSI) reference model, and acquiring unique identification information of an authentication partner device in an extended authentication sequence of a predetermined authentication method upon execution of a process command at an application layer of the OSI reference model, the application layer process command being provided within a packet of an authentication process that is processed at the network layer or lower of the OSI reference mode;
performing a matching of said acquired unique identification information of said communication destination device with said acquired unique identification information of said authentication partner device;
judging, based upon a successful matching, whether said authentication partner device is a device connected to a same local network as a local network to which a local device being a communication source device is connected; wherein said unique identification information received from said communication destination device is a node unique ID defined in IEEE 1394 standards; and wherein in said acquiring receives, as said unique identification information received from said communication destination device, identification information acquired from a PHY communication unit of said communication destination device and identification information acquired by a network communication unit of said communication destination device, and comparing processing matches said identification information acquired from said PHY communication unit of said communication destination device and identification information acquired by said network communication unit of said communication destination device.

6. The communication controlling method as claimed in claim 5, wherein said acquiring said unique identification information received from said authentication partner device is received as processed data generated by an encryption process or a hash value generation process based on secret information shared with said communication source device.

7. The communication controlling method as claimed in claim 5, wherein said unique identification information received from said communication destination device is a device address defined in communication standards.

8. The communication controlling method as claimed in claim 5, wherein said acquiring receives, as said unique identification information received from said communication destination device, a device address as a source address of a packet transmitted from the communication destination device, and a device address stored in a packet by said data processing at the application layer or data based on the device address at the application layer, and said matching matches said device address as the source address of the packet and said device address stored in the packet.

9. A computer readable storage medium encoded with computer program instructions which, when executed, cause a processor to execute a method of communication via a network, said method comprising:
acquiring unique identification information of a communication destination device in a communication process by data processing at a network layer or lower of an open system interconnection (OSI) reference model, and acquiring unique identification information of an authentication partner device in an extended authentication sequence of a predetermined authentication method upon execution of a command at an application layer of the OSI reference model, the application layer process command being provided within a packet of an authentication process that is processed at the network lager or lower of the OSI reference mode;
performing a matching of said acquired unique identification information of said communication destination device with said acquired unique identification information of said authentication partner device;
judging, based upon a successful matching, whether said authentication partner device is a device connected to a same local network as a local network to which a local device being a communication source device is connected;
wherein said unique identification information received from said communication destination device is a node unique ID defined in IEEE 1394 standards; and wherein said communication processing apparatus is configured to receive, as said unique identification information received from said communication destination device, identification information acquired from a PHY communication unit of said communication destination device and identification information acquired by a network communication unit of said communication destination device, and compare said identification information acquired from the PHY communication unit of said communication destination device and the identification information acquired by the network communication destination device.

* * * * *